United States Patent
Madej et al.

(10) Patent No.: US 9,152,834 B2
(45) Date of Patent: Oct. 6, 2015

(54) IMAGE CAPTURE BASED ON SCANNING RESOLUTION SETTING COMPARED TO DETERMINED SCANNING RESOLUTION RELATIVE TO TARGET DISTANCE IN BARCODE READING

(75) Inventors: Dariusz J. Madej, Shoreham, NY (US); Miroslav Trajkovic, East Setauket, NY (US); Bruno Vande Vyvre, Westhampton, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 131 days.

(21) Appl. No.: 13/570,915

(22) Filed: Aug. 9, 2012

(65) Prior Publication Data

US 2014/0042297 A1 Feb. 13, 2014

(51) Int. Cl.
*G06K 7/10* (2006.01)
*H01J 3/14* (2006.01)

(52) U.S. Cl.
CPC ........ *G06K 7/10722* (2013.01); *G06K 7/10821* (2013.01)

(58) Field of Classification Search
CPC ..... G01S 17/66; G01S 17/87; G06K 7/10821; G06K 7/10722; H01L 27/146; G01J 1/44; H01J 3/14
USPC ........... 250/208.1, 216, 221, 222.1, 235, 236, 250/566; 235/440, 462.21, 462.42, 462.01, 235/462.11, 462.2
See application file for complete search history.

(56) References Cited

U.S. PATENT DOCUMENTS

| | | | |
|---|---|---|---|
| 5,185,817 | A | 2/1993 | Degi et al. |
| 5,410,141 | A | 4/1995 | Koenck et al. |
| 5,710,417 | A | 1/1998 | Joseph et al. |
| 5,930,501 | A | 7/1999 | Neil |
| 6,226,421 | B1 | 5/2001 | Monji |
| 6,650,368 | B1 | 11/2003 | Doron |
| 6,729,546 | B2 * | 5/2004 | Roustaei .................. 235/462.45 |
| 6,734,958 | B1 | 5/2004 | MacKinnon et al. |
| 7,257,278 | B2 | 8/2007 | Burks et al. |
| 7,260,614 | B2 | 8/2007 | Deshpande et al. |
| 7,303,131 | B2 | 12/2007 | Carlson et al. |

(Continued)

FOREIGN PATENT DOCUMENTS

| | | |
|---|---|---|
| EP | 2202666 A2 | 6/2010 |
| WO | 9850814 A1 | 11/1998 |

OTHER PUBLICATIONS

International Search Report mailed Nov. 18, 2013 in counterpart PCT application PCT/US2013/052319 filed Aug. 9, 2012.

*Primary Examiner* — Francis M Legasse, Jr.
*Assistant Examiner* — Don Williams
(74) *Attorney, Agent, or Firm* — Nong-Qiang Fan

(57) ABSTRACT

An arrangement for, and a method of, electro-optically reading a target by image capture, employ an aiming assembly for projecting an aiming light pattern on the target that is located within a range of working distances relative to a housing, an imaging assembly for capturing an image of the target and of the aiming light pattern over a field of view, and a controller for determining a distance of the target relative to the housing based on a position of the aiming light pattern in the captured image, for determining a scanning resolution based on the determined distance, for comparing the determined scanning resolution with a scanning resolution setting, and for processing the captured image based on the comparison.

14 Claims, 6 Drawing Sheets

(56) References Cited

U.S. PATENT DOCUMENTS

| | | |
|---|---|---|
| 7,347,371 B2 | 3/2008 | Joseph et al. |
| 7,369,161 B2 | 5/2008 | Easwar et al. |
| 7,654,958 B2 | 2/2010 | Byrd et al. |
| 7,726,575 B2 * | 6/2010 | Wang et al. ............... 235/462.42 |
| 7,802,305 B1 | 9/2010 | Leeds |
| 7,886,972 B2 | 2/2011 | Skaaksrud et al. |
| 7,934,660 B2 | 5/2011 | Yeakley et al. |
| 8,083,146 B2 | 12/2011 | Carlson et al. |
| 8,104,685 B2 | 1/2012 | Seo |
| 8,146,820 B2 | 4/2012 | Wang et al. |
| 2005/0122218 A1 | 6/2005 | Goggin |
| 2009/0267895 A1 | 10/2009 | Bunch et al. |
| 2010/0108766 A1 | 5/2010 | Madej et al. |
| 2010/0140356 A1 | 6/2010 | Hawley et al. |
| 2012/0043385 A1 | 2/2012 | Trajkovic et al. |
| 2012/0048938 A1 | 3/2012 | He |

\* cited by examiner

IMAGE CAPTURE BASED ON SCANNING RESOLUTION SETTING COMPARED TO DETERMINED SCANNING RESOLUTION RELATIVE TO TARGET DISTANCE IN BARCODE READING

FIELD OF THE DISCLOSURE

The present disclosure relates generally to an arrangement for, and a method of, electro-optically reading a target, particularly a non-symbol target, such as a document bearing alphanumeric characters, by image capture, by determining a scanning resolution based on a distance of the target relative to the arrangement, by comparing the determined scanning resolution with a scanning resolution setting, and by processing a captured target image based on the comparison.

BACKGROUND

Solid-state imaging systems or imaging readers have been used, in both handheld and/or hands-free modes of operation, to electro-optically read targets, such as one- and two-dimensional bar code symbols, each bearing elements, e.g., bars and spaces, of different widths and reflectivities, to be decoded, as well as non-symbol or form targets, such as documents, labels, receipts, signatures, drivers' licenses, and payment/loyalty cards, each bearing alphanumeric characters, as well as pictures, to be imaged. A known exemplary imaging reader includes a housing either held by a user and/or supported on a support surface, a window supported by the housing and aimed at the target, and an imaging engine or module supported by the housing and having a solid-state imager (or image sensor) with a sensor array of photocells or light sensors (also known as pixels), and an imaging lens assembly for capturing return light scattered and/or reflected from the target being imaged along an imaging axis through the window over a field of view, and for projecting the return light onto the sensor array to initiate capture of an image of the target over a range of working distances in which the target can be read. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol, or into a picture of a non-symbol target.

In order to increase the amount of the return light captured by the sensor array, especially in dimly lit environments and/or at far range imaging and reading, the known imaging module may also have an illuminating light assembly for illuminating the target with illumination light from an illuminating light source, e.g., one or more light emitting diodes (LEDs) and illuminating lenses, for reflection and scattering therefrom. The known imaging module may also have an aiming light assembly for projecting an aiming light pattern or mark, such as a "crosshair" pattern, with aiming light from an aiming light source, e.g., an aiming laser or one or more LEDs, through aiming lenses on the target prior to imaging. The user aims the aiming pattern on the target to be imaged during an aiming mode prior to imaging and reading.

In the hands-free mode, the user may slide or swipe the target past the window in either horizontal and/or vertical and/or diagonal directions in a "swipe" mode. Alternatively, the user may present the target to an approximate central region of the window in a "presentation" mode. The choice depends on the type of target, operator preference, or on the layout of a workstation in which the reader is used. In the handheld mode, the user holds the reader in his or her hand at a certain distance from the target to be imaged and initially aims the reader at the target. The user may first lift the reader from a countertop or a support stand or cradle. Once reading is completed, the user may return the reader to the countertop or to the support stand to resume hands-free operation.

Although the known imaging readers are generally satisfactory for their intended purpose, one concern relates to the scanning resolution (also known as pixel resolution), often expressed by a value measured in pixels per inch (ppi). Scanning resolution refers to the size of the smallest target detail that the sensor array can resolve (assuming the focus of the imaging lens assembly is adequate), which is determined by the size of the detail in the target image projected onto the sensor array. Put another way, the scanning resolution can be defined as the size of the smallest detail on the target that a single pixel of the sensor array can resolve. The target image on the sensor array grows smaller as the distance to the target is increased. When the target image approaches (for instance) around the same size as a pixel, the end of the working range has been reached, simply because, if the target moves any further away than that, then the smallest detail can no longer be resolved by the sensor array.

It is standard for the controller of the known reader to energize an indicator, such as a beeper or an indicating light emitting diode (LED), to advise a user that a symbol target has been successfully decoded. Thus, if the user receives no such feedback when attempting to read a symbol target at one distance, then the user will simply move the symbol target and/or the reader to another distance until such feedback is received.

However, when reading a non-symbol or form target, such as a document, there is no such equivalent feedback. If the scanning resolution is low at a particular distance, then the captured image will lack sufficient detail, be blurry, and perhaps illegible, particularly if, for example, the captured image is subsequently used as an input to recognition software, such as facial or object recognition software, or optical character recognition (OCR) software, or optical mark recognition (OMR) software, or intelligent character recognition (ICR) software, etc. The user will not be alerted to the poor quality, or lack of sharpness, of the image being captured and is not guided to try and get a better quality, or sharper, image by perhaps changing the distance between the reader and the document.

Accordingly, there is a need to provide an arrangement for, and a method of, electro-optically reading a target, particularly a non-symbol target, by image capture, based on an evaluation of the scanning resolution based on the target distance and by providing user feedback, especially if a minimum scanning resolution setting is not met.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
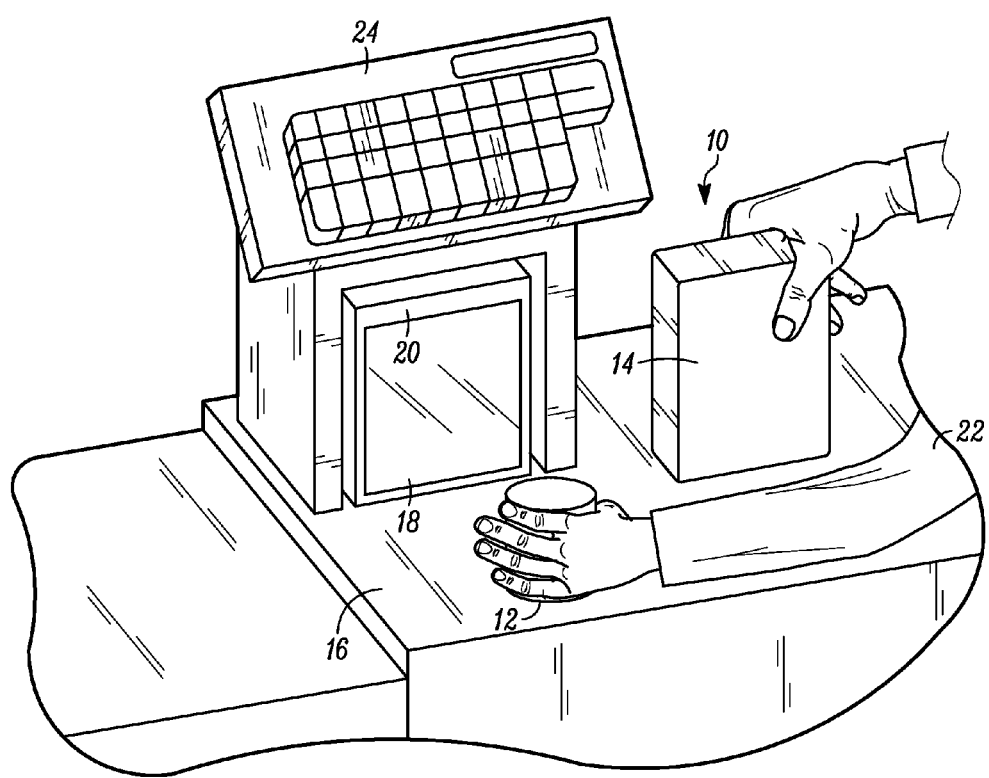
FIG. 1 is a perspective view of an imaging reader operative in a hands-free mode for capturing light from targets to be electro-optically read.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One feature of this invention resides, briefly stated, in an arrangement for electro-optically reading a target, particularly a non-symbol or form target, such as a document bearing alphanumeric characters, by image capture. The arrangement comprises a housing, an aiming assembly for projecting an aiming light pattern on the target that is located within a range of working distances relative to the housing, and an imaging assembly for capturing an image of the target and of the aiming light pattern over a field of view. In accordance with one aspect of this invention, a programmed microprocessor or controller is operative for determining a distance of the target relative to the housing based on a position of the aiming light pattern in the captured image, for determining a scanning resolution based on the determined distance, for comparing the determined scanning resolution with a scanning resolution setting, and for processing the captured image based on the comparison.

The imaging assembly advantageously includes a solid-state imager having an array of image sensors, preferably, a CCD or a CMOS array, and at least one imaging lens for focusing the captured image onto the array. A memory is preferably accessible by the controller, for storing the scanning resolution as a function of target distance.

The controller is operative for determining the target distance during a ranging frame, and for processing the captured image during a processing frame that occurs at a different time than the ranging frame. One or more processing frames can alternate with one or more ranging frames in any desired timing sequence. Preferably, the controller can operate at multiple frames per second.

In accordance with another aspect of this invention, a method of electro-optically reading a target by image capture is performed by projecting an aiming light pattern on the target that is located within a range of working distances relative to a housing, capturing an image of the target and of the aiming light pattern over a field of view, determining a distance of the target relative to the housing based on a position of the aiming light pattern in the captured image, determining a scanning resolution based on the determined distance, comparing the determined scanning resolution with a scanning resolution setting, and processing the captured image based on the comparison.

Reference numeral 10 in FIG. 1 generally identifies a workstation for processing transactions and specifically a checkout counter at a retail site at which products, such as a vial 12 having a label that bears alphanumeric characters, or a box 14 bearing a symbol target, are processed. The label on the vial 12 is but one example of a non-symbol target that can benefit from this invention. Other non-symbol targets may include documents, other labels, receipts, signatures, drivers' licenses, payment/loyalty cards, employee badges, pictures, etc.

The counter includes a countertop 16 across which the products are slid at a swipe speed past, or presented to, a generally vertical or upright planar window 18 of a box-shaped, vertical slot reader or imaging reader 20 mounted on the countertop 16. A checkout clerk or user 22 is located at one side of the countertop, and the imaging reader 20 is located at the opposite side. A host or cash/credit register 24 is located within easy reach of the user. The user 22 can also hold the imaging reader 20 in one's hand during imaging.

Figure 2:
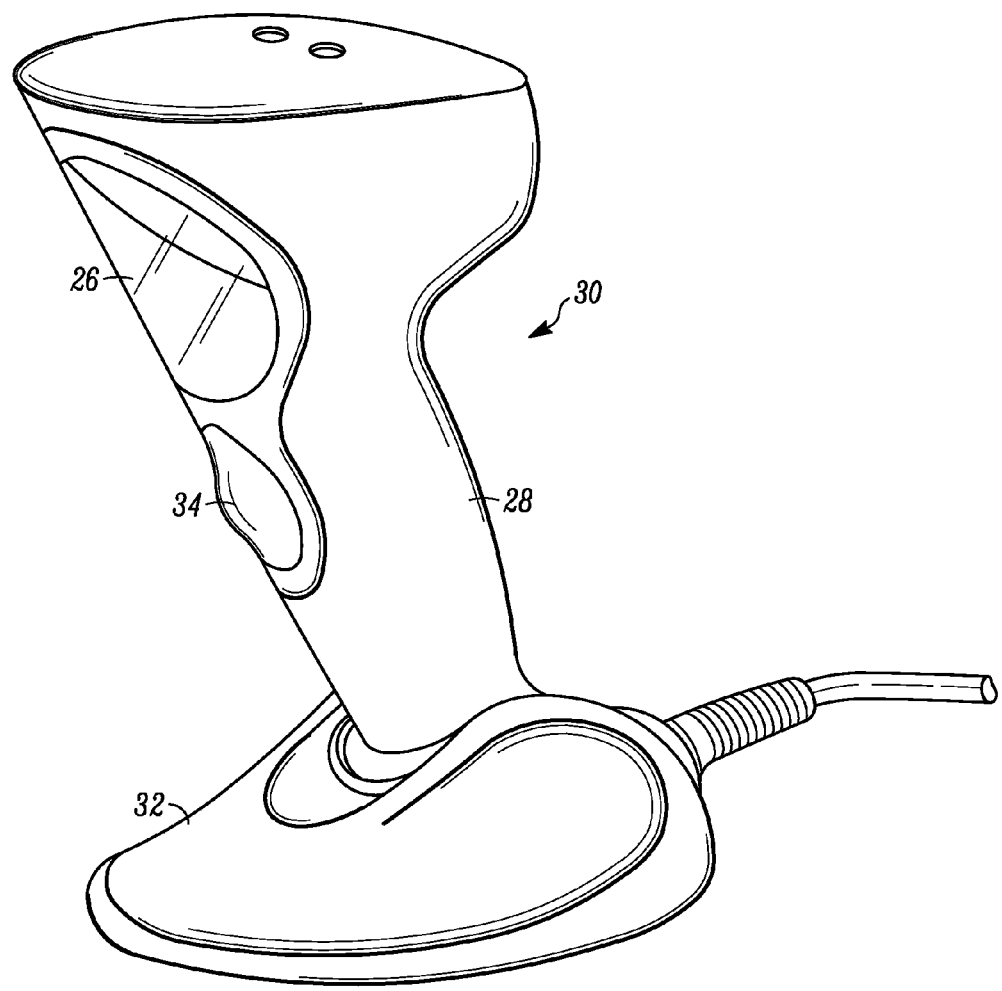
FIG. 2 is a perspective view of another imaging reader operative in either a hand-held mode, or a hands-free mode, for capturing light from targets to be electro-optically read.

Reference numeral 30 in FIG. 2 generally identifies another imaging reader having a different configuration from that of imaging reader 20. Imaging reader 30 also has a generally vertical or upright window 26 and a gun-shaped housing 28 supported by a base 32 for supporting the imaging reader 30 on a countertop. The imaging reader 30 can thus be used as a stationary workstation in which products are slid or swiped past, or presented to, the vertical window 26, or can be picked up off the countertop and held in the operator's hand and used as a handheld imaging reader in which a trigger 34 is manually depressed to initiate imaging of a target. In another variation, the base 32 can be omitted.

Figure 3:
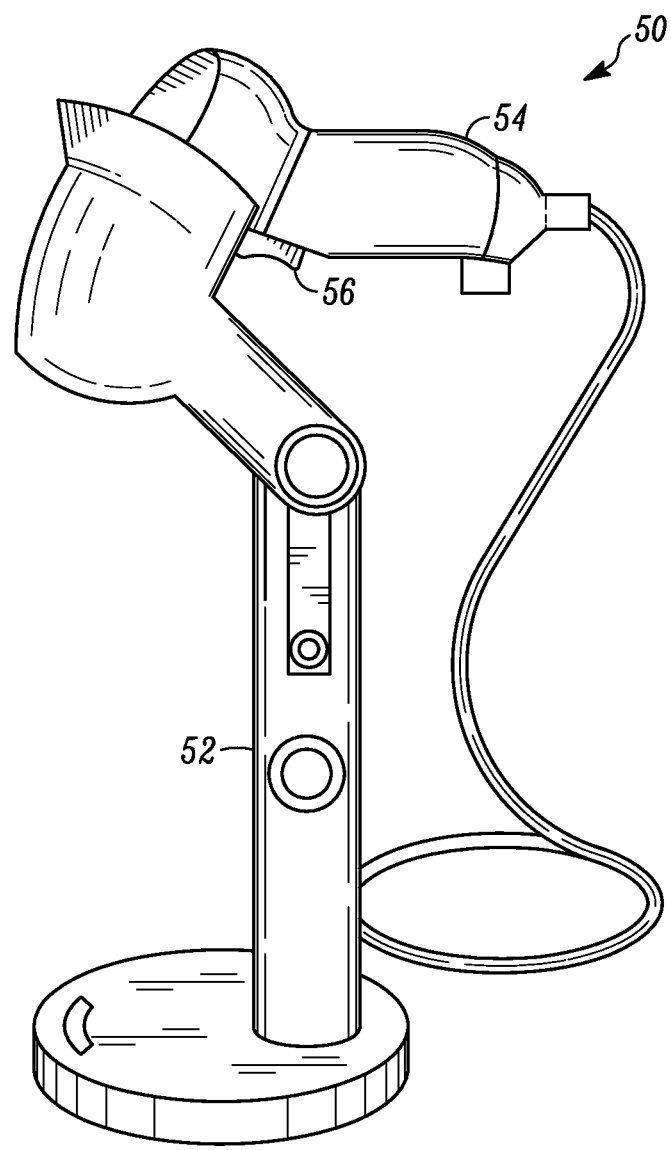
FIG. 3 is a perspective view of still another imaging reader operative in either a hand-held mode, or a hands-free mode, for capturing light from targets to be electro-optically read.

Reference numeral 50 in FIG. 3 generally identifies another electro-optical imaging reader having yet another operational configuration from that of imaging readers 20, 30. Reader 50 has a window and a gun-shaped housing 54 and is shown supported in a workstation mode by a stand 52 on a countertop. The reader 50 can thus be used as a stationary workstation in which products are slid or swiped past, or presented to, its window, or can be picked up off the stand and held in the operator's hand in a handheld mode and used as a handheld system in which a trigger 56 is manually depressed to initiate reading of the symbol.

Figure 4:
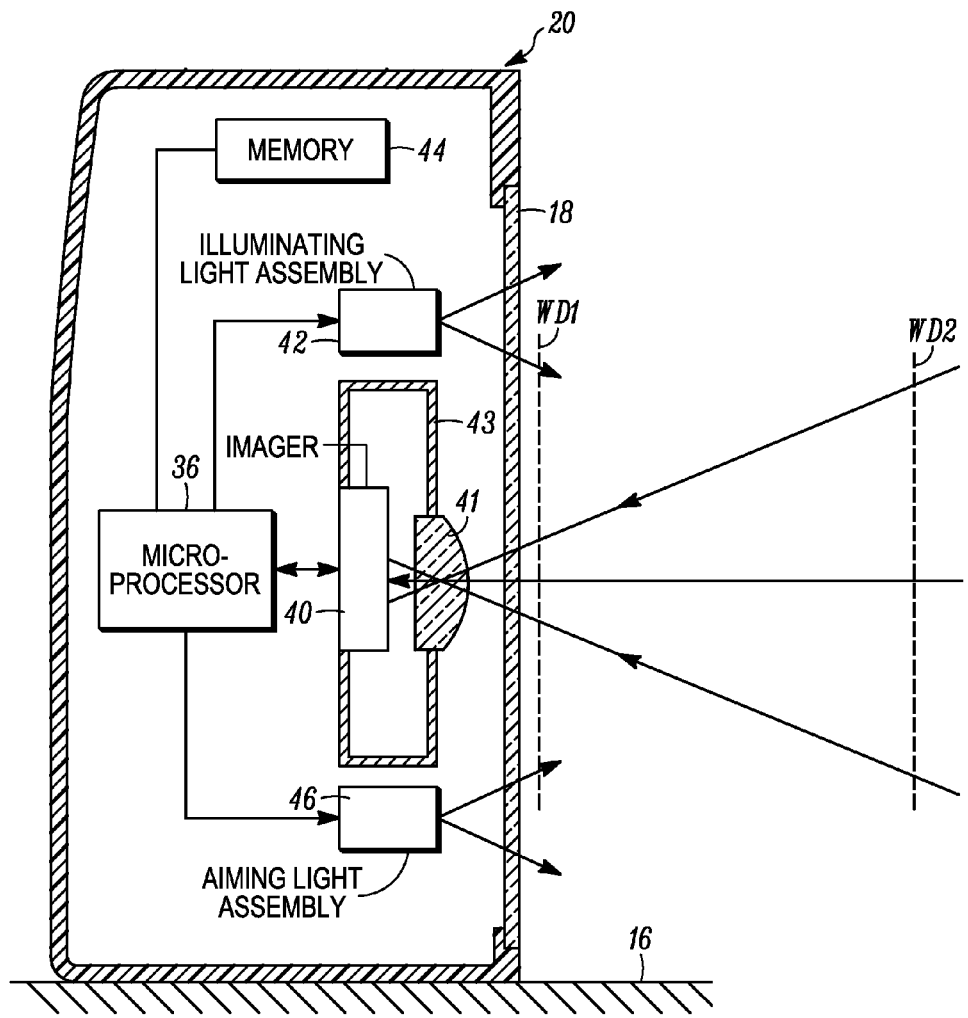
FIG. 4 is a schematic diagram of various components of the reader of FIG. 1 in accordance with the present invention.

Although the present invention can be used with any of the readers 20, 30, 50, it has particular benefit and utility for a handheld reader, such as reader 30 or reader 50. As shown in FIG. 4, the reader includes an imaging assembly having an imager 40 and at least one focusing lens 41 that are mounted in a chassis 43 mounted within a housing of the reader. The imager 40 is a solid-state device, for example, a CCD or a CMOS imager and has an area array of addressable image sensors or pixels operative for capturing light through the window 18 over a field of view from a target 12, 14 located at a target distance in a working range of distances, such as close-in working distance (WD1) and far-out working distance (WD2) relative to the window 18. In a preferred embodiment, WD1 is about one inch away from the focusing lens 41, and WD2 is about ten inches away from the focusing lens 41. Other numerical values for these distances are contemplated by this invention.

An illuminating light assembly 42 is also mounted in the housing of the imaging reader and preferably includes a plurality of illuminating light sources, e.g., light emitting diodes (LEDs) and illuminating lenses arranged to uniformly illuminate the target with illumination light. An aiming light assembly 46 is also mounted in the housing and is operative for projecting an aiming light pattern or mark, such as a "crosshair" pattern, with aiming light from an aiming light source, e.g., an aiming laser or one or more LEDs, through aiming lenses on the target. The user aims the aiming pattern on the target to be imaged. As shown in FIG. 4, the imager 40, the illuminating LEDs of the illuminating assembly 42, and the aiming light source of the aiming light assembly 46 are operatively connected to a controller or programmed microprocessor 36 operative for controlling the operation of these components. Preferably, the microprocessor 36 is the same as the one used for decoding return light scattered from a symbol target and/or for processing the captured target images.

In operation, the microprocessor 36 sends command signals to energize the aiming light source to project the aiming light pattern on the target, to energize the illuminating LEDs 42 for a short time period, say 500 microseconds or less to illuminate the target, and also to energize the imager 40 to collect light from the target only during said time period. A typical array needs about 11 to 33 milliseconds to acquire the entire target image and operates at a frame rate of about 30 to 90 frames per second. The array may have on the order of one million addressable image sensors.

In accordance with one aspect of this invention, the microprocessor 36 is operative, during a ranging frame, for determining a distance of the target relative to the housing based on a position of the aiming light pattern in the captured image. The determination of the distance of the target relative to the housing based on the position of the aiming light pattern in the captured image is performed as described in U.S. Pat. Nos. 7,303,131 and 7,347,371, the entire contents of said patents being incorporated herein by reference thereto.

The microprocessor 36 is further operative, during the ranging frame, for determining a scanning resolution based on the determined distance. A memory 44 is accessible by the microprocessor 36, for storing the scanning resolution as a function of target distance, as, for example, summarized by the following exemplary Table 1, in which the target distance is the distance between the target and the imaging lens 41, and in which the field of view is on the order of forty degrees. The values listed in Table 1 are derived in advance based on the angle of the field of view and the sensor resolution. Instead of storing the ppi for each target distance in the memory 44, the microprocessor 36 can compute the ppi in real time as a function of the angle of the field of view and the sensor resolution.

TABLE 1

| Target Distance (inches) | Scanning Resolution (ppi) |
| --- | --- |
| 1 | 1033 |
| 2 | 517 |
| 3 | 344 |
| 4 | 258 |
| 5 | 207 |
| 6 | 172 |
| 7 | 148 |
| 8 | 129 |
| 9 | 115 |
| 10 | 103 |

Figure 5:
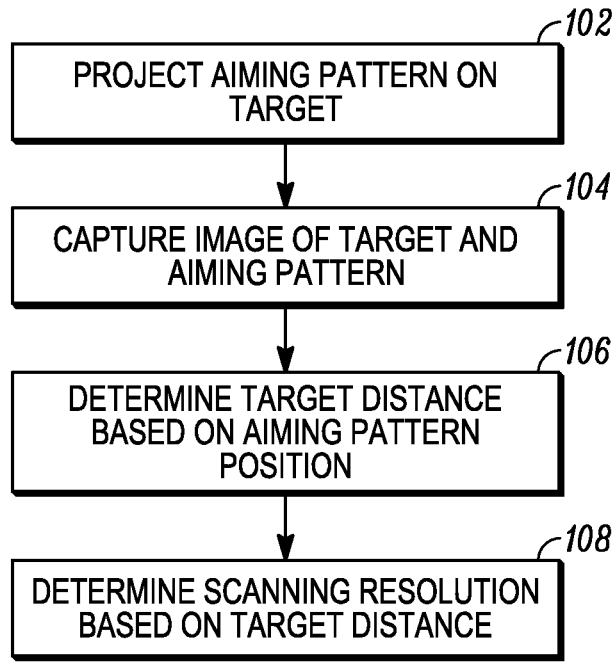
FIG. 5 is a flow chart depicting steps performed during a ranging frame in accordance with a method of the present invention.

FIG. 5 depicts the actions that are performed during the ranging frame. The aiming light pattern is projected onto the target by having the microprocessor 36 energize the aiming light source in step 102. The entire image of the target and of the aiming pattern is captured by having the microprocessor 36 energize the imager 40 in step 104. The determination of the distance of the target relative to the housing based on the position of the aiming light pattern in the captured image is performed by the microprocessor 36 in step 106. The microprocessor 36 accesses the memory 44 and retrieves the scanning resolution for the determined target distance in step 108. Now, the microprocessor 36 knows the scanning resolution at which the target is going to be imaged.

Figure 6:
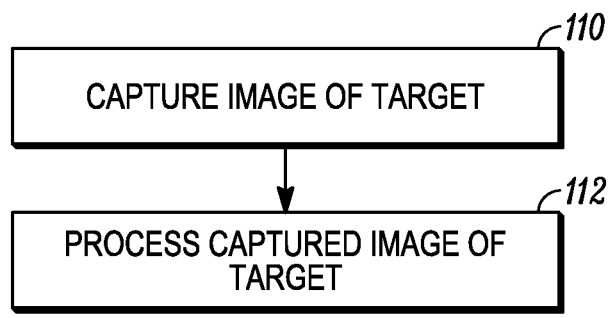
FIG. 6 is a flow chart depicting steps performed during a processing frame in accordance with the method of the present invention.

FIG. 6 depicts the actions that are performed during a processing frame that occurs at a different time than the ranging frame. The image of the target is captured by having the microprocessor 36 energize the imager 40 in step 110. The captured image of the target is decoded (in the case of a symbol target) and/or processed (in the case of a non-symbol target) by the microprocessor 36 in step 112.

Figure 7:
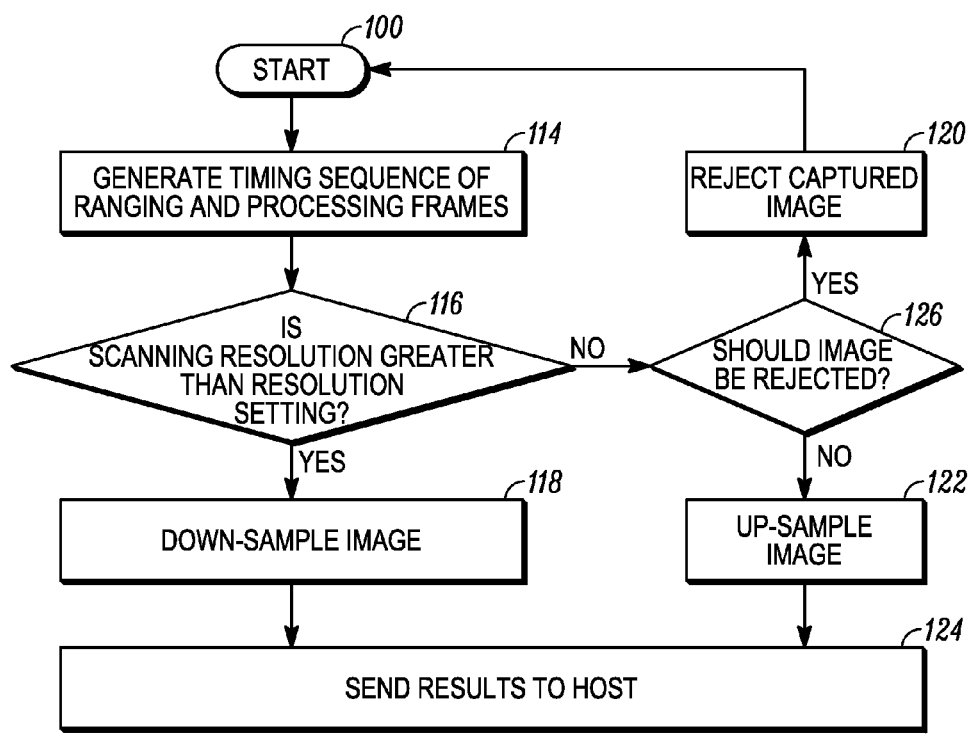
FIG. 7 is a flow chart depicting operation of the method in accordance with the present invention.

FIG. 7 depicts the overall actions that are performed by the microprocessor 36. Starting from start step 100, the microprocessor 36 generates a timing sequence of the aforementioned ranging and processing frames in step 114. One or more processing frames can alternate with one or more ranging frames in any desired timing sequence. By way of non-limiting examples, each ranging frame can alternate with each processing frame, or each ranging frame can occur after every two successive processing frames.

Then, the microprocessor 36 compares the determined scanning resolution with one or more scanning resolution settings in step 116. Each setting can be selected by the user, or by a particular application, or by the reader manufacturer, to be any desired value. The settings can include a minimum desired resolution value (e.g., 300 ppi) that is desired, or a minimum acceptable resolution (e.g., 200 ppi) that is deemed acceptable, or a range of minimum desired resolution values, or a range of minimum acceptable resolution values, to produce a sharp, clear image with sufficient detail. Each setting, or range, can be changed from one value, or set of values, to another depending on the type of target being read. Each setting or range can be loaded into the microprocessor by various means, for example, by reading a bar code during a calibration mode of operation.

The microprocessor 36 is further operative for processing the captured image based on the comparison between the determined scanning resolution and at least one of the scanning resolution settings, e.g., the minimum desired resolution and/or the minimum acceptable resolution and/or ranges of the desired/acceptable resolutions. If the determined scanning resolution is less than the minimum acceptable resolution setting, then the microprocessor 36 determines, in step 126, whether or not the image should be rejected. If so, then the microprocessor 36 rejects the captured image, and energizes a beeper/annunciator, to advise the user to change the target distance at step 120, and returns to the start block 100 to await another target or another attempt to read the same target. If the image is not to be rejected, for example, as pre-set by the user, then the microprocessor 36 up-samples the image, for example, to the minimum acceptable resolution setting in step 122 by means of well known techniques, e.g., pixel interpolation, sinc filtering, etc., prior to sending the up-sampled image to a host computer in step 124 and advising the user that a successful image capture has occurred.

If the determined scanning resolution is equal to, or greater than, the minimum acceptable resolution setting in step 116, then the microprocessor 36 accepts the captured image. When the determined scanning resolution is higher than that required, e.g., when the target is too close to the reader, then the microprocessor 36 may down-sample the captured image in step 118 by means of pixel selection, or by mapping, etc., and then send the down-sampled image to the host computer in step 124 and advise the user that a successful image capture has occurred. Alternatively, the microprocessor 36 may signal the user to increase the target distance. Down-sampling is particularly desirable when a particular application imposes a limit on the size of the file that contains the captured image.

By way of numerical example, assume, as noted above, that the minimum desired resolution value is 300 ppi to ensure a clear, sharp image with sufficient detail to be read. As set forth above in Table 1, if the target distance is four or more inches, then that minimum desired resolution value will not be met. The microprocessor 36 will either reject any attempt to read the target at four or more inches, or, if so pre-set, up-sample the image to meet the minimum desired resolution value of 300 ppi. The microprocessor 36 will accept any attempt to read the target at three or fewer inches. Of course, different minimum desired resolution values could be employed.

As another example, assume that the minimum desired resolution value is 300 ppi to ensure a clear, sharp image, and that the minimum acceptable resolution value is 200 ppi. Now, there are two thresholds to satisfy. If the determined scanning resolution is less than 200 ppi, then the captured image will be rejected. If the determined scanning resolution lies between 200 and 300 ppi, then the captured image will be digitally improved, e.g., up-sampled. If both the minimum desired resolution and the minimum acceptable resolution are the same (and that can be the default), then if the determined resolution is less than the minimum desired resolution, the image will be rejected.

In the foregoing specification, specific embodiments have been described. However, one of ordinary skill in the art appreciates that various modifications and changes can be made without departing from the scope of the invention as set forth in the claims below. For example, the arrangement described herein is not intended to be limited to a stand-alone electro-optical reader, but could be implemented as an auxiliary system in other apparatus, such as a computer or mobile terminal. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for electro-optically reading a target by image capture, comprising:
   a housing;
   an aiming assembly for projecting an aiming light pattern on the target that is located within a range of working distances relative to the housing;
   an imaging assembly for capturing an image of the target and of the aiming light pattern over a field of view;
   a controller for determining a distance of the target relative to the housing based on a position of the aiming light pattern captured during a ranging frame, for determining a scanning resolution based on the determined distance, for comparing the determined scanning resolution with a scanning resolution setting, and for processing the image captured during a processing frame that occurs at a different time than the ranging frame;
   wherein the controller is operative for rejecting the captured image when the determined scanning resolution is less than the scanning resolution setting, and for advising a user to change the distance of the target; and
   wherein the controller is operative for accepting the captured image only if the determined scanning resolution is at least equal to the scanning resolution setting.

2. The arrangement of claim 1, wherein the imaging assembly includes a solid-state imager having an array of image sensors, and an imaging lens for focusing the captured image onto the array.

3. The arrangement of claim 1, and a memory accessible by the controller, for storing the scanning resolution as a function of the distance of the target.

4. The arrangement of claim 1, wherein the controller is operative for generating the ranging frame and the processing frame in any desired time sequence.

5. The arrangement of claim 1, wherein the controller is operative for down-sampling the captured image when the determined scanning resolution is greater than the scanning resolution setting.

6. The arrangement of claim 1, wherein the controller is operative for up-sampling the captured image when the determined scanning resolution is smaller than the scanning resolution setting.

7. The arrangement of claim 1, wherein the scanning resolution setting is one of a minimum desired resolution value, a minimum acceptable resolution value, a range of minimum desired resolution values, and a range of minimum acceptable resolution values.

8. A method of electro-optically reading a target by image capture, comprising the steps of:
   projecting an aiming light pattern on the target that is located within a range of working distances relative to a housing;
   determining a distance of the target relative to the housing based on a position of the aiming light pattern captured during a ranging frame;
   determining a scanning resolution based on the determined distance;
   comparing the determined scanning resolution with a scanning resolution setting; and
   processing an image of the target during a processing frame that occurs at a different time than the ranging frame based on the comparison of whether the determined scanning resolution is less than the scanning resolution setting,
   (1) if the determined scanning resolution is less than the scanning resolution setting, rejecting the captured image and advising a user to change the distance of the target, and
   (2) if the determined scanning resolution is at least equal to the scanning resolution setting, accepting the captured image.

9. The method of claim 8, wherein the capturing step is performed by a solid-state imager having an array of image sensors, and by an imaging lens that focuses the captured image onto the array.

10. The method of claim 8, and storing the scanning resolution as a function of the distance of the target.

11. The method of claim 8, and generating the ranging frame and the processing frame in any desired time sequence.

12. The method of claim 8, and down-sampling the captured image when the determined scanning resolution is greater than the scanning resolution setting.

13. The method of claim 8, and up-sampling the captured image when the determined scanning resolution is smaller than the scanning resolution setting.

14. The method of claim 8, and configuring the scanning resolution setting to be one of a minimum desired resolution value, a minimum acceptable resolution value, a range of minimum desired resolution values, and a range of minimum acceptable resolution values.

* * * * *